Aug. 31, 1965
G. L. REBER
3,203,779
METHOD FOR FORMING FLAT BOTTOM GLASS BEAKERS
Original Filed April 14, 1958
5 Sheets-Sheet 1
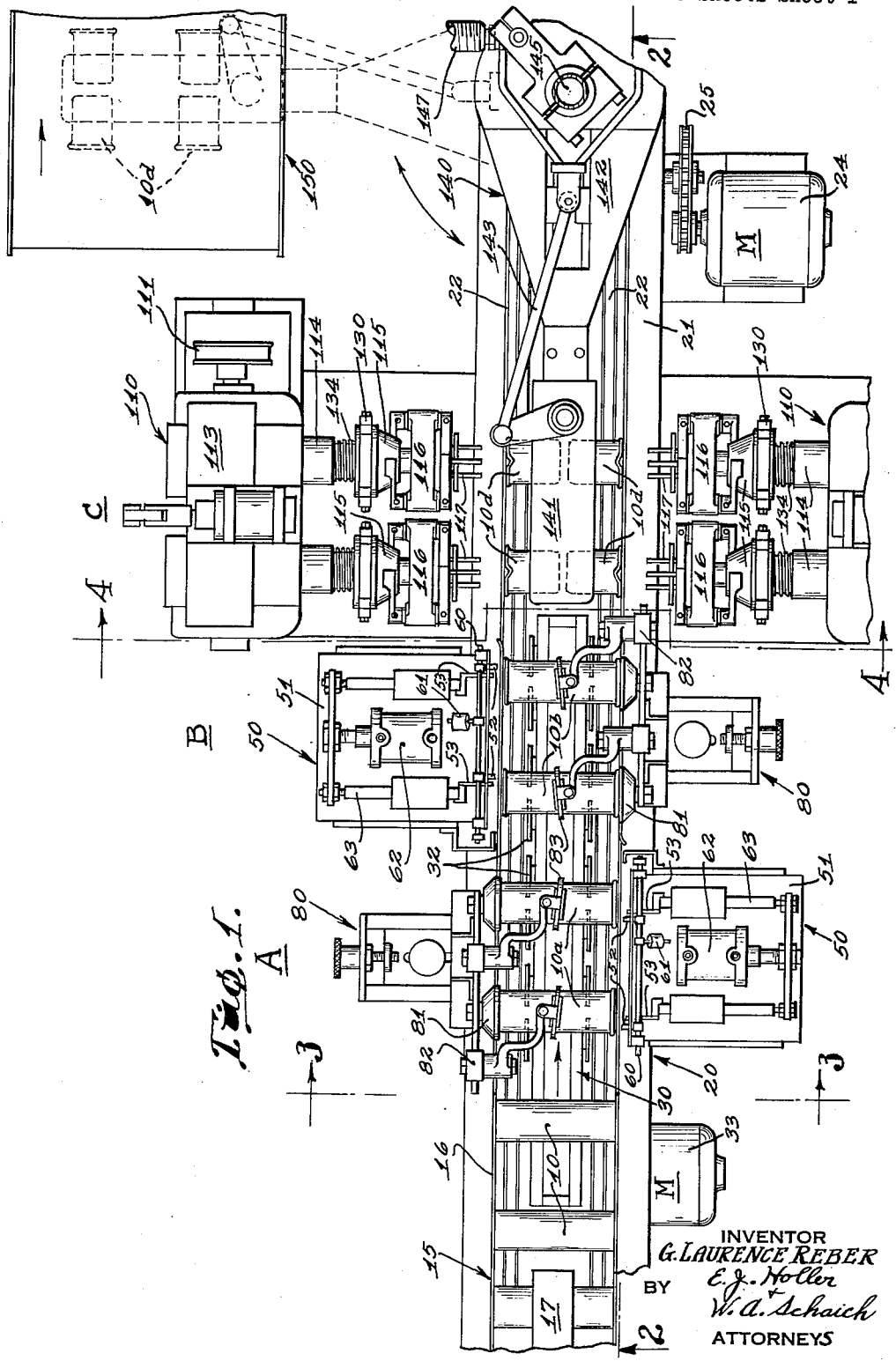
INVENTOR
G. LAURENCE REBER
BY E. J. Holler
W. A. Schaich
ATTORNEYS

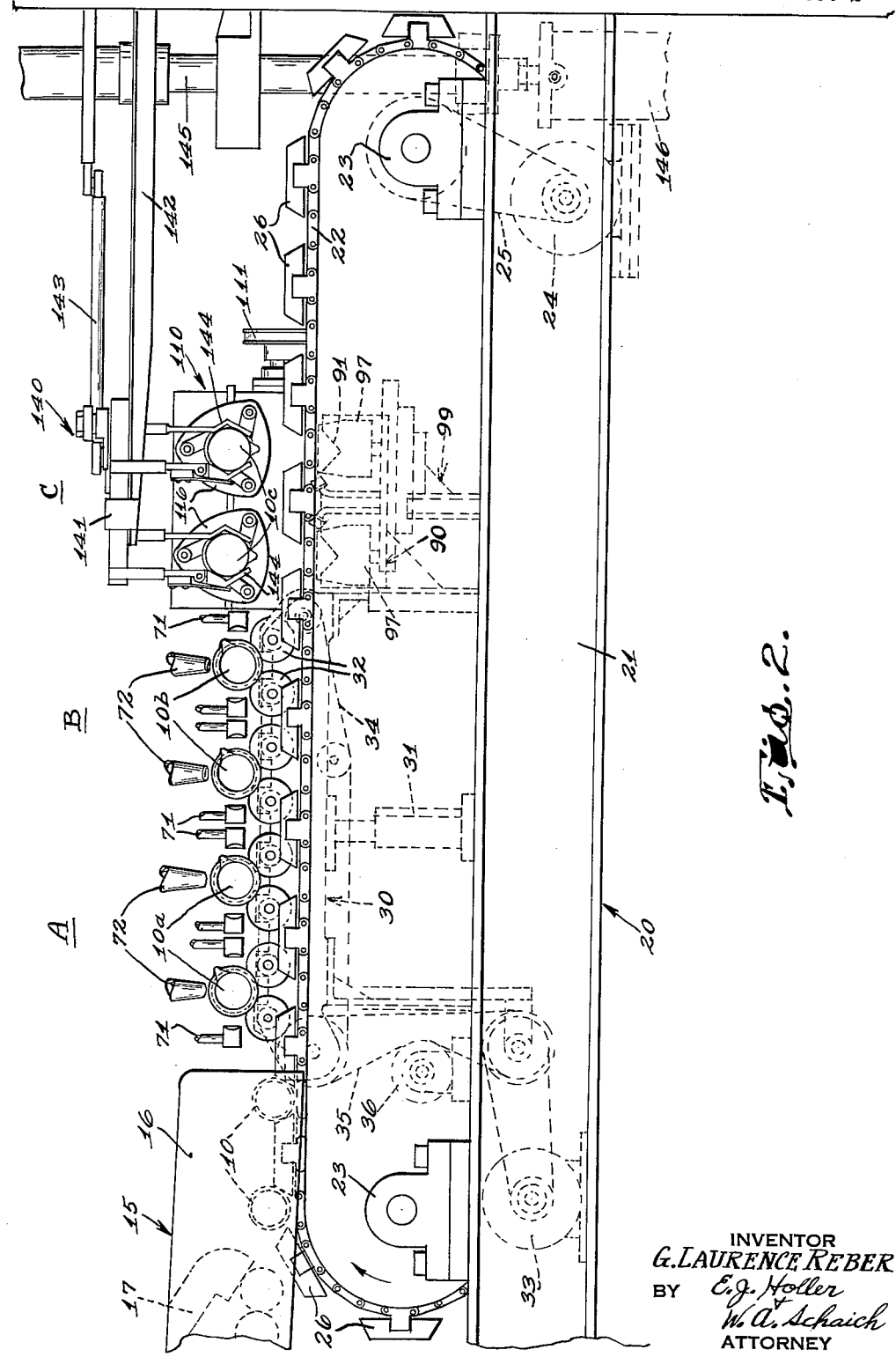

Aug. 31, 1965 G. L. REBER 3,203,779
METHOD FOR FORMING FLAT BOTTOM GLASS BEAKERS
Original Filed April 14, 1958 5 Sheets-Sheet 3
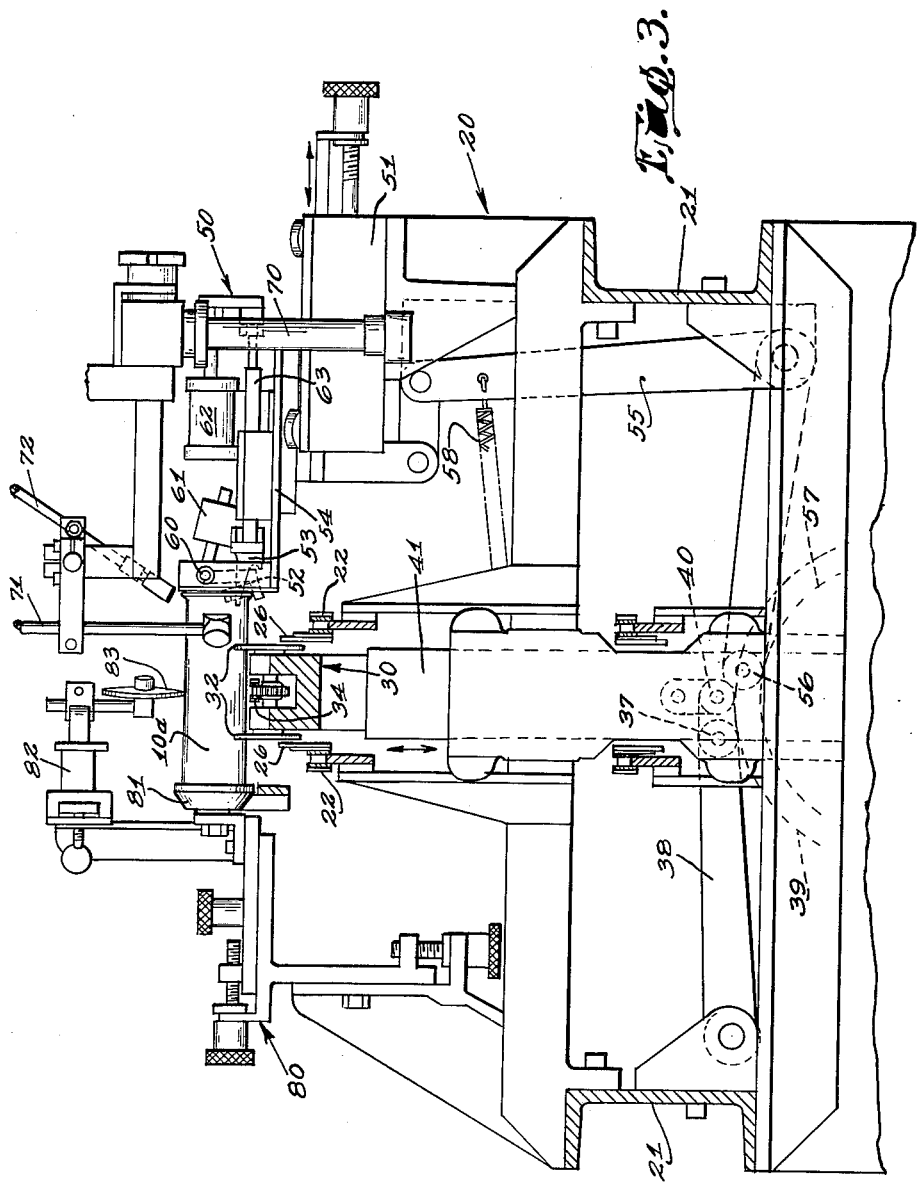
INVENTOR
G. LAURENCE REBER
BY E. J. Holler
W. A. Schaich
ATTORNEYS

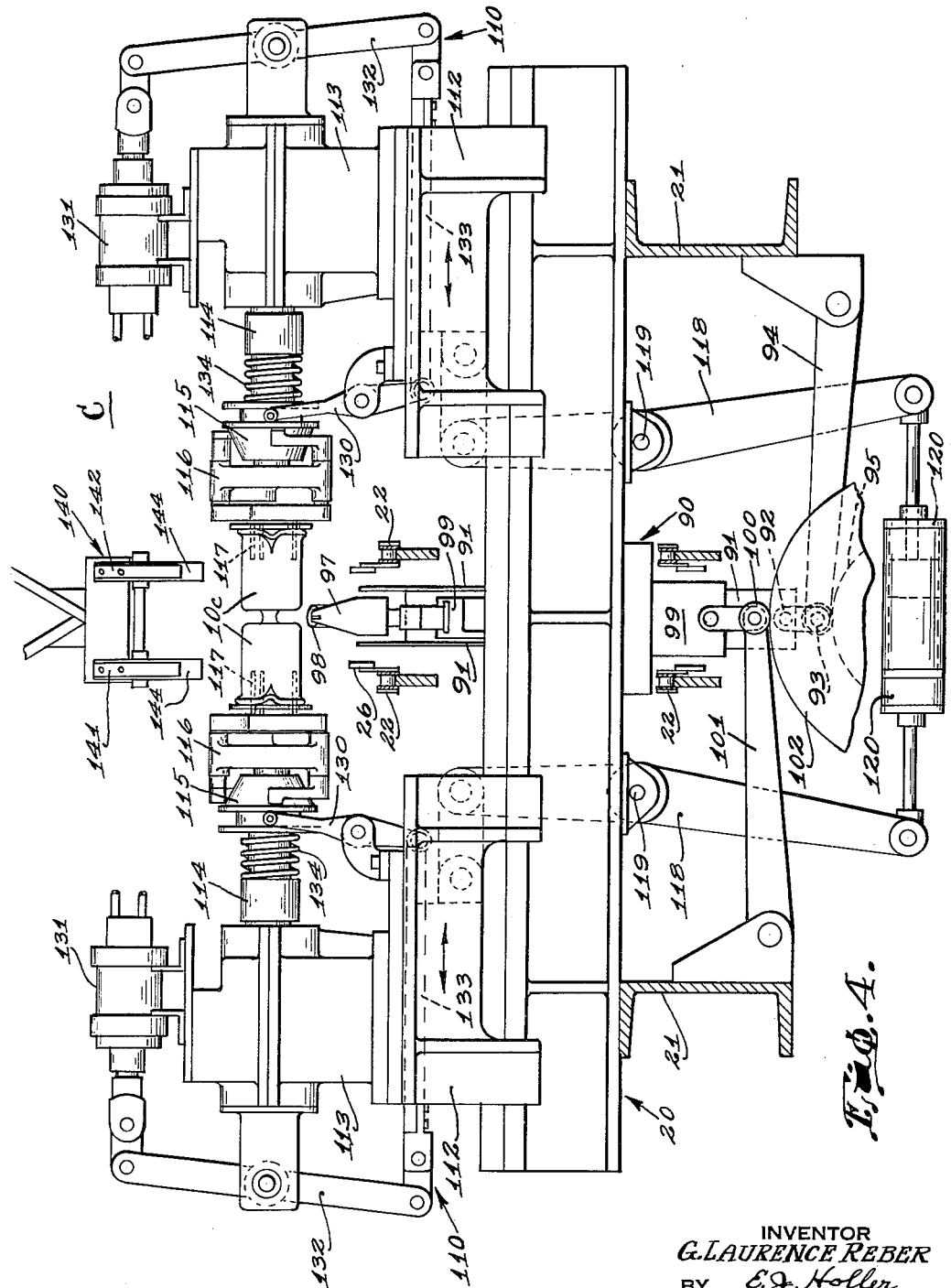

Aug. 31, 1965    G. L. REBER    3,203,779
METHOD FOR FORMING FLAT BOTTOM GLASS BEAKERS
Original Filed April 14, 1958    5 Sheets—Sheet 5
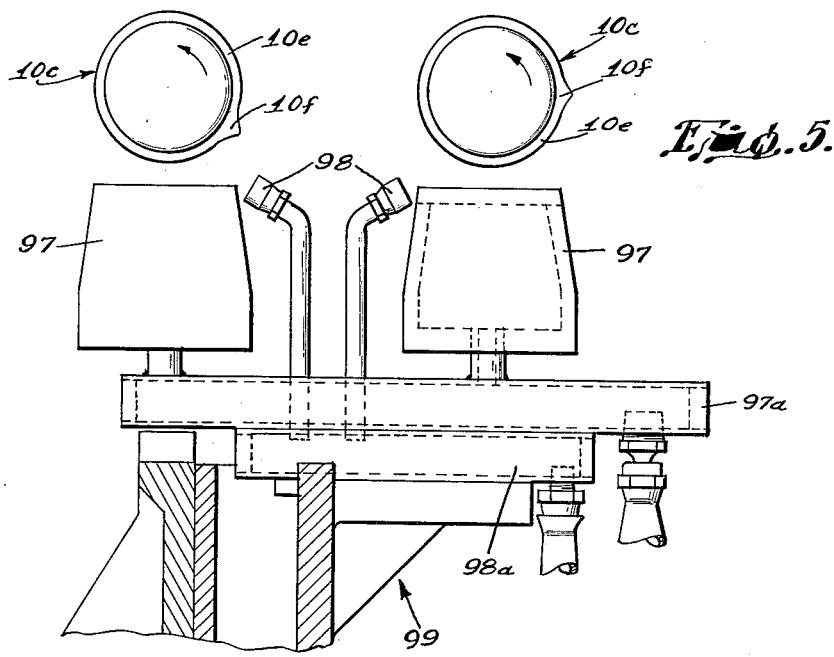
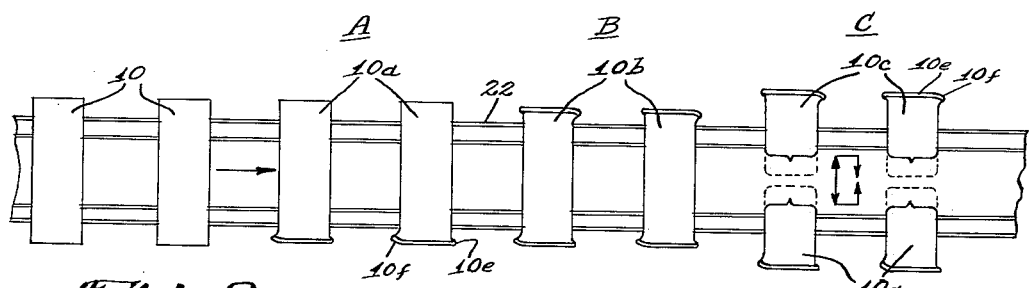
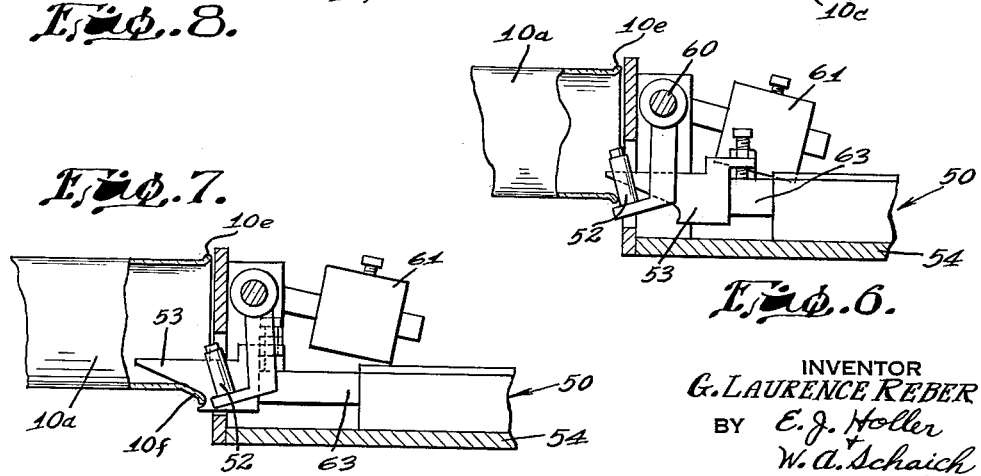
INVENTOR
G. LAURENCE REBER
BY E. J. Holler
W. A. Schaich
ATTORNEYS United States Patent Office 3,203,779
Patented Aug. 31, 1965

3,203,779
METHOD FOR FORMING FLAT BOTTOM GLASS BEAKERS
Guy L. Reber, Newfield, N.J., assignor to Owens-Illinois Glass Company, a corporation of Ohio
Continuation of application Ser. No. 728,258, Apr. 14, 1958. This application July 1, 1963, Ser. No. 296,417
4 Claims. (Cl. 65—105)

The subject application constitutes a continuing application of my earlier-filed copending application, Serial No. 728,258, filed April 14, 1958, now abandoned.

The present invention relates to methods and machines for automatically producing glass beakers or similar containers having wide-mouthed openings and a projecting lip.

Heretofore, glass beakers have been formed conventionally by laborious hand gathering and blowing methods. Obviously, forming such articles singly in handworking operations has been a costly procedure, particularly where the nature of the articles do not permit a high unit price. This is especially true in smaller sizes of beakers up to 100 ml. and 150 ml. capacities, for example, where mold equipment and labor costs have made such fabrication uneconomical.

Accordingly, it is an object of my invention to provide means for forming glass beakers from tubular glass blanks while they are moved intermittently along a predetermined path prior to introduction of the completed beakers into an annealing lehr.

Another object of the invention is the provision of novel automatic apparatus whereby tubular glass blanks are supplied sequentially in groups to end forming stations and a twin bottoming station to form pairs of similar beakers from each of the blanks in an economical manner.

Another object of the present invention is to provide a novel beaker forming machine for converting tubular glass blanks, during their stepwise transfer to and retention in groups of two or more at end shaping and separating stations, into pairs of similar glass beakers each having an annular flared lip and projecting pour-out spout at its mouth and an essentially right-angled bottom.

Another object of this invention is to provide novel apparatus constituting a beaker forming machine adaptable to adjustment for accommodation of tubular glass blanks of different length and diameter to regularly position the blanks with relation to lip flaring, pour-out spout forming and bottom forming devices to produce beakers of varied sizes.

A further object of this invention is to provide a novel method of simultaneously forming pairs of glass beakers from individual tubular glass blanks processed in groups of two or more during their intermittent conveyance in a lineal direction to two end forming and one bottom forming station and their axial rotation, heat-softening and shaping thereat into fully fabricated articles.

A still further object of this invention is to provide a unique method of conveying a series of tubular glass blanks in groups of two or more and in recumbent spaced-apart positions normal to their direction of travel to two individual end forming stations and a unitary bottoming station for heat-softening and shaping localized portions of the blanks thereat during both localized portions of the blanks thereat during both rotative movement and stationary retention of the blanks to produce pairs of similar beakers from each blank.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

In the drawings:

FIG. 1 is a top plan view showing the entire beaker forming machine;

FIG. 2 is a side elevational view taken along the line 2—2 of FIG. 1 showing various operative components of the machine in broken lines;

FIG. 3 is an enlarged vertical sectional view taken along the line 3—3 of FIG. 1 showing one end forming station of the machine;

FIG. 4 is an enlarged vertical sectional view taken along the line 4—4 of FIG. 1 showing the bottoming station of the machine;

FIG. 5 is a further enlarged vertical sectional view of the burner arrangement in operative position at the bottoming station normal to that shown in the central portion of FIG. 4;

FIG. 6 is a further enlarged fragmentary vertical sectional view of one portion of FIG. 3 illustrating a flaring device in contact with one end portion of a tubular blank;

FIG. 7 is a view similar to FIG. 6 showing the spout forming device in operative relationship; and FIG. 8 is a view illustrating schematically the successive operations performed upon the blanks in their conversion to beakers.

The present invention is especially applicable to producing pairs of similar glass beakers from single tubular glass blanks. It is to be understood that the invention is equally applicable to forming beakers from tubular blanks of other thermoplastic material which may also be heat-softened into workable condition and reshaped as set forth below. For purposes of describing the preferred apparatus and method of forming beakers, the disclosure is primarily directed to producing glass beakers and provides a noteworthy advance in the field of fabricating borosilicate glass beakers.

The machine basically consists of a lineal conveyor for intermittently carrying groups of tubular blanks in recumbent position to an initial end forming station. At this station the blanks are elevated and rotated in alignment while heat is applied to end portions facing in the same direction. The end portions are shaped in unison with several suitable tools disposed on one side of the conveyor. The blanks are then conveyed to a second end forming station where the opposite ends are likewise heat-softened and shaped with similar tools so that both ends of the blanks have annularly flared lips and projecting pour-out spouts. The unitary blanks are then conveyed to a bottoming station where their shaped ends are retained by grasping devices and the blanks rotated within a series of burner fires for heat-softening their central or intermediate portions, the twin bottoms of the beakers being formed during retraction and re-extension of rotatable grasping elements to effect twin bottoming of the beakers in a single operation. The freshly formed beakers are then transported by a transfer arm operative essentially through a right angle and in both upward and downward movement at its pick up and discharge positions to deliver the completed beakers onto a moving lehr belt, cooling table or other conveyor.

The tubular blanks 10 which are introduced to the present apparatus are substantially of the same length and diameter. The blanks may be severed by various known cutting devices from extensive lengths of tubing into individual sections having right cylindrical configuration adapted to produce two beakers. The major portions of the blank sidewalls remain uneffected by the hereinafter described method and apparatus and thus become integral sidewalls of completed beakers. The prescribed length and diameter of the blanks are selected within predetermined limits to form a pair of beakers having the desired capacity.

Apparatus

The blanks 10 are delivered to the forming mechanism of the present invention from a feeding hopper or tray 15 (FIGS. 1 and 2) having an inclined gravity feed surface down which the blanks 10 may roll in recumbent positions to be picked up singuarly by the machine. The tray 15 has vertical rails or sidewalls 16 to limit lateral disposition of the blanks as they are fed to the beaker machine. A pivoted arm 17 is mounted interiorly within tray 15 to contact individual blanks 10 timed to operate in synchronism with the machine conveyor. Thus, the blanks 10 are supplied to the machine at a prescribed rate for their distribution in uniformly-spaced relationship upon the machine conveyor.

The machine 20 consists of a base or frame 21 upon which is mounted a conveyor 22 of the endless chain type. Conveyor 22 has two parallel endless belts or chains adapted to rotate over sprockets which are mounted on shafts journaled within the conveyor end blocks 23 mounted on the frame 21. The conveyor is powered by a motor 24 operatively connected to one of the sprocket shafts by a belt or chain drive assembly 25. The motor 24 and drive assembly 25 operate the conveyor 22 intermittently in regularly timed sequence to deliver the blanks 10 to two end forming stations and a single bottom forming station of the machine. Links of the conveyor belts have inclined spacing blocks or plates 26 mounted thereon to receive the sidewalls of the blanks for their retention and conveyance in uniformly-spaced horizontal positions with their axes normal to the direction of travel.

A lifting table 30 extends throughout the two end forming stations designated by the letters "A" and "B" at which individual end portions of the blanks are shaped. The table 30 extends coaxially and within the two upper reaches of the twin belts or chains of conveyor 22. Table 30 is operable upwardly and downwardly by an elevating device 31 employed to raise and lower the blanks 10 while they are resting on pairs of power-driven wheels 32. Two pairs of wheels 32 are employed to support each blank, a total of four blanks being shown in elevated relation resting on eight pairs of wheels 32 in FIGS. 1 and 2. Wheels 32 are driven by an electric motor 33 mounted on the machine frame 21. The motor 33 is connected to drive several endless belts or chain link assemblies 34 and 35, the former engaging the drive shafts of each of the pairs of wheels 32. Endless belt or chain 34 is driven by vertically disposed sprocket and belt assembly 35 which is adapted to move with the table 30. A fixed sprocket 36 mounted on frame 21 engages belt assembly 35 to insure positive rotation of the wheels 32 during raising and lowering of the table.

As shown on FIG. 3, table 30 is vertically operable through a given distance to raise and lower the blanks 10 to and from the two end shaping stations above conveyor 22, the wheels or discs 32 effecting their rotation thereat. The table may lower the blanks 10 to their lowermost position retained by plates 26 attached to conveyor 22 and provide clearance for movement of the conveyor.

Table 30 is moved upwardly and downwardly (FIG. 3) by a cam roller 37 mounted on a lever arm 38 which is pivoted at one end. The other end of arm 38 has a linkage connection 40 adapted to raise and lower a center post 41 of the end forming table 30 when cam roller 37 is actuated by contact with cycling cam 39. One revolution of cam 39 will effect one raising and lowering operation of the table 30.

A carriage 50 is mounted at each end forming station slidably disposed for horizontal travel normal to the conveyor 22 within a stationary block 51. A carriage plate 54 has several end forming tools 52 and 53 mounted thereon which move into and out of operative engagement with the blanks 10. The carriage 50 is moved into and out of contacting engagement with the blanks by an L-shaped lever arm 55 pivotally attached to the machine frame 21. Arm 55 has a cam roller 56 mounted on its inner end which is actuated by contact with cycling cam 57. Roller 56 is held against the larger motivating cam 57 by a tension spring 58 which engages lever arm 55 and the frame 21.

Two lip forming tools 52 are disposed on carriage plate 54 to engage heat-softened end portions of two individual blanks simultaneously. Tools 52 are affixed to a pivotal shaft 60 having an adjustable counter weight 61 to apply a loading pressure against the softened glass when the flaring tools are brought into contact with the blanks 10a.

Two pour-out spout forming tools 53 are also mounted on plate 54. Tools 53 are operated horizontally by an air cylinder motor 62 with connecting rods 63 joining a piston shaft to each of the forming tools.

A stationary column 70 is mounted on the machine frame adjacent to stationary carriage blocks 51 for retention of a plurality of burner nozzles 71 and 72 in near relationship to the end portions of the blanks in elevated position for their heat-softening. Burner nozzles 71 are mounted on both sides of each blank near the end to be shaped, and nozzles 72 are arranged to deliver a burner fire interiorly of the blank when the carriage 50 is partially retracted to heat-soften a localized area of the blank end for pour-out spout forming.

On the opposite side of the machine and juxtaposed from movable carriage 50 is located a stationary, although fully adjustable, assembly 80 for retaining a freely rotatable back-up wheel or element 81 against which the blanks 10a are retained in the end shaping operation. The assembly 80 has several upwardly extending arms 82 mounted adjacent to elements 81, each of which supports a pivoted freely rotatable wheel 83 which serves to maintain a single blank in alignment during the end forming operation. Each wheel 83 is arranged in angular relationship with respect to the conveyor axis to contact an upper portion of blank 10a for its maintenance against back-up element 81.

As further shown on FIG. 3 all of the operative elements which retain the blanks 10a in alignment as well as those which effect rotation, heating, or shaping of the blank ends are adapted to adjustable arrangement so that various sizes of blanks may be accommodated during individual campaigns of the beaker forming machine.

Similar end forming equipment in reverse position is utilized at the second end-forming station designated by the letter "B" on FIGS. 1 and 2. The mechanisms are adjustably arranged to perform their functions upon the blank ends in a horizontal plane above the conveyor, into which operative plane the elevating table 30 moves the blanks 10a and 10b. At the second end forming station the previously shaped ends of the blanks 10a are maintained against the rotatable stop elements 81 and freely rotatable wheels 83 are angularly disposed in the opposite direction to maintain the blanks in alignment thereagainst.

Referring now to FIG. 4, which comprises the bottoming station for the glass workpieces, a cradle lift 90 is coaxially disposed within conveyor 22 having pairs of movable V-shaped notched plates 91 facing upwardly for elevating the blanks 10c into bottoming position. The lower portion of cradle lift 90 is vertically actuated by a cam roller 93 which contacts a cycling cam 95 to effect its movement. Cam roller 93 is mounted on the movable end of pivoted lever arm 94 with a linkage 92 interconnecting with cradle lift 90.

A burner lift 99 is mounted coaxially with the cradle lift 91 and is actuated by another cam roller 100 disposed at the free end of a pivoted lever arm 101 which contacts and is actuated by another cycling cam 102. A suitable interconnecting linkage is employed to join the free end of arm 101 and burner lift 99.

Several burner blocks 97 are mounted at the upper end of the burner lifting device 99 having a lineal series of burner nozzles which are mounted substantially coaxially with the machine conveyor 22. Several other individual burners 98 are also disposed coaxially with and adjacent to each of the burner blocks 97 directed at annular corner portions of the blanks 10c as formed.

At the bottoming station "C" as shown on FIG. 4, the blanks 10c having both mouth ends properly shaped may be elevated by the cradle lifting device 91 in horizontal relationship above conveyor 22 to be engaged by end grasping means.

The end grasping and rotative devices 110 which are located on both sides of the machine frame in opposing alignment consist of stationary plates or blocks 112 which support movable housing members 113 which retain pairs of rotative shafts 114. Shafts 114 are adapted to rotation in synchronism by driving means such as an electric motor (not shown) adapted to power the shafts through a chain and sprocket arrangement 111 and worm gearing within the housing 113. Each of the shafts 114 has a chuck 115 on their inwardly facing ends which support automatic chucking elements 116. Triangularly segmented chucking elements 116 are able to expand or contract three projecting fingers 117 when moved laterally by bell crank arms 130 independently of movement of housing 113 or their angular rotation thereby. The chucks 115 are moved against compression springs 134 by the bell crank arms 130 in disengagement of the fingers 117.

The end grasping devices 110 may move simultaneously in lateral movement normal to conveyor 22 in a horizontal plane on the stationary machine plates 112 by operation of two air cylinder motors 120 having piston arms connected to the lower ends of similar lever arms 118. Arms 118 each rotate about pivot points designated by the numeral 119 and are connected to the slidable housing members 113.

The bell crank arms 130 are operated by air cylinder motors 131 mounted on housings 113. The motor pistons are joined to the lower portions of the bell crank arms 130 by connecting arms 132 and 133. Thus, by lateral movement of the chucks with respect to the housings 113, each of the sets of three projecting fingers 117 may penetrate the interiors of the blank ends for their positive retention. Upon introduction of air into either side of the cylinders 131 the grasping fingers 117 of the rotative mechanisms may be controllably expanded to engage with and contracted to disengage from the ends of the glass blanks 10c.

The end grasping devices 110 are adaptable to precisely regulable movement in grasping the end portions of the blanks as well as their retraction in pulling transverse intermediate portions of the blanks 10c following their heat-softening into workable condition.

A transfer arm 140 is mounted to swing over the bottoming station "C" of the machine to facilitate both vertical elevation of the newly formed beakers as well as their angular movement above the end grasping devices 110 to a point of deposition. The take-out device 140 may be comprised of two horizontal telescoping plates 141 and 142 having a series of grasping fingers 144 attached to downwardly extending arms for their engagement with exterior surfaces of the beakers 10d as formed. Pairs of the fingers are arranged in opposing relationship to grasp central areas of each of the beakers as formed. A lever arm 143 (FIG. 1) adapted to angular movement of one end thereof is able to bring the fingers 144 into engagement with the beakers 10d. The transfer arm 140 is mounted upon a vertical column 145 which is disposed centrally of and at the terminating end of machine conveyor 22. Take-out arms 141 and 142 are capable of both vertical movement by an air operated cylinder 146 (FIG. 2) as well as arcuate movement about column 145 by a horizontally disposed air cylinder motor (not shown).

The newly formed beakers 10d may be deposited by transfer arm 140 onto another conveyor 150 as shown in FIG. 1 for their conveyance to an annealing lehr or a subsequent operation such as etching.

*Operation*

Operation of the machine which is not apparent from the foregoing description of its component parts will be described hereinafter.

The blanks 10 are conveyed from the delivery tray or hopper 15 onto intermittent conveyor 22 arranged in lineal relationship to carry the tubular blanks in recumbent spaced apart positions with their axes substantially normal to the direction of travel. Conveyor 22 moves stepwise through an initial end forming station, a second end forming station and a twin bottoming station. The machine is timed so that each of these operations may be completed and the workpieces returned to rest upon the conveyor before its movement to the next station.

The blanks are moved in groups of two or more, two being shown in the drawings in one embodiment of the invention, to the initial end forming station designated by the letter "A." This is clearly shown in the FIGS. 1, 2 and 3 of the drawings as well as schematically in FIG. 8. With the blanks at rest upon conveyor 22 the table 30 elevates the pair of blanks 10a simultaneously to the initial end forming station. The power driven wheels 32 of table 30 start to rotate in the same direction with the blank sidewalls in contact therewith. The blanks are moved by the angularly disposed overhead wheels 83 to contact the stop disc 81 to secure both positive alignment and firm retention of the blanks during rotation.

The carriage 50 which carries both the independently operable flaring devices 52 and pour-out spout forming devices 53 for each of the blanks 10a is moved into initial near relationship with the blank end. Prior to and during this time the adjacently disposed burners 71 have their fires directed at and impinging the end portions during blank rotation for controlled heat-softening. With the pair of blanks 10a being rotated as shown in FIGS. 2 and 3, the glass is heated into workable condition and the flaring device 52 is brought into contact therewith bearing downwardly and outwardly upon the softened glass (FIG. 6). The several flaring devices 52 work in unison upon the two individual blanks pivoted about the horizontal shaft 60, the force applied to the flaring being governed by the adjustment of counter weight 61 and the relative position of carriage 50. During the entire flaring procedure rotation of the blanks is maintained. The annular flared lip 10e is formed as shown in FIG. 6.

Following the flaring or lip forming of the annular end portions of the blanks, rotation of the blanks is stopped and carriage 50 is retracted a short distance at which time burner 72 is ignited. Burner 72 is directed downwardly and at a localized interior portion of the lower side of each blank end which is heated thereby. The concentrated burner heat softens this area within a relatively short period following which the movable carriage 50 is moved into near relation with the blank end a second time. Air cylinder 62 is operated to project pour-out spout forming tool 53 interiorly beyond the flare out forming tool 52 to contact the glass as shown in FIG. 7. The pour-out spout 10f (FIG. 7) has a gently curved inner surface with a line of greatest depth coaxial with the blank axis. Carriage 50 is then withdrawn by the action of its cam roller 56 so that it is retracted from near relationship with the newly shaped end portion. At this time or prior thereto the burner fires supplied by nozzle 71 may be reduced in intensity to eliminate distortion of annular portions of the blank during pour-out spout forming. Table 30 is then lowered by action of its cam roller 37 so that the uppermost wheels 32 retract below the level of conveyor 22 with the partially formed blanks 10a resting on spacing plates 26.

Conveyor 22 then moves through an equivalent distance to the second end forming station designated by the letter "B" where the blanks come to rest. The blanks are again elevated by table 30 into proper relationship with similar heating and end shaping devices located on the opposite side of the machine.

The same steps are undergone at the second end forming station as at the former so that the second end of the blank also is shaped into a flared lip and pour-out spout. The mechanisms which operate tools 52 and 53 may be arranged to perform similar shaping operations on the blanks so that the beakers have essentially identical contours at their mouths in final form. Obviously, the pour-out spouts on the blank ends may be formed in widely varying relationship at the two stations, but this is of no consequence since the blanks then undergo a separating operation at the next station.

After the second end of the blank is shaped as stated, the table 30 repeats its lowering procedure with the blanks 10b resting on the machine conveyor. The pair of blanks is then moved to the bottoming station designated by the letter "C." At this station an independent cradle lift 90 is elevated by its cam roller 93 to raise the blanks between and in alignment with the fingers 117 of the end grasping and rotative devices 110. After elevation of the blanks the grasping and rotating devices 110 simultaneously move into engagement with the blanks, the fingers 117 then being expanded to positively contact inner surfaces of the blanks. The fingers 117 may be covered with resilient and/or heat resistive material since the blanks still retain considerable residual heat from the end shaping operations. Rotation of the blanks 10c is then initiated.

Following engagement of both ends of the blanks by the fingers 117, the cradle lift 90 is lowered by its cam 93 and the burner lift 99 is operated upwardly by its roller cam 100. Burner blocks 97 and 98 are elevated into near and transverse relationship with medial portions of the blanks 10c. The burner fires are controlled to impinge a lineal series of intense fires against medial portions of each blank to cause a heat-softening of the glass over a relatively short time. Burners 98 have fires of different intensity directed at the corner of the blank as separated. Burners 98 are supplied a combustible fuel mixture by manifold 98a while burner blocks 97 are supplied with a different fuel mixture by manifold 97a. The lineal series of burner fires are controlled so that while the rotative grasping devices are retracted during rotation of the blanks, the glass in the sidewalls of each blank flows into a central region therebetween and separates into an essentially right-angled bottom on both sides of the line of division. The burner fires are automatically controlled during this interval to insure a twin bottoming operation during carefully controlled pulling of the glass. The rotative end grasping devices 110 separate to a point where the glass is fully separated with a slight projecting tip on each bottom center. The devices then move the partially formed beakers into nearer relationship with the burner fires so that the glass may be further worked and distributed by the lineal fires to eliminate the projections and produce a slight concavity of the outer bottom surface to insure stability of the completed article. The bottoms have well distributed nearly uniform thicknesses with a short radius annular corner.

Following the bottoming operation the burner fires are extinguished except for a pilot light remaining ignited and the transfer device 140 is lowered so that its fingers 144 surround and engage the sidewalls of the beakers 10d for their retention. The grasping fingers 117 then retract from within the beakers and the transfer device 140 is elevated by its hydraulic cylinder 146 to its uppermost position. The transfer device then moves the beakers through an arcuate path of essentially a right-angle pivoting about its vertical column 145 to swing the beakers over an inspection table or annealing lehr conveyor 150 as shown in FIG. 1. The transfer device then lowers to deposit the beakers near the upper surface of the belt, for example, whereupon the fingers 144 of the device disengage and the beakers 10d are readily available for sand blasting, etching, annealing or other operations.

Various other modifications may be resorted to within the spirit and scope of the appended claims.

I claim:

1. The method of simultaneously producing a pair of flat-bottomed glass beakers from a single tubular glass blank comprising the steps of rotating the blank about its axis in horizontal position, heating open-ended portions of said blank in stepwise relation into softened condition by adjacently-opposed burner fires during said rotation, flaring each of said end portions of the blank with an angularly-disposed flaring tool, stopping the rotation and shaping a localized area of each flared end portion into an outwardly-projecting pour-out spout, subsequently resuming rapid rotation of the blank, heating an intermediate medial portion of said blank into heat-softened condition by a lineal series of burner fires, directing the fires toward the intermediate portion of the blank at a right angle to the axis of the blank, controllably separating the blank at its heated intermediate medial portion during continued heating and rotation of the blank, drawing the separated sections fully apart to form irregular closed ends, and thereafter moving the separated sections axially toward and continuing heating of said ends and moving the same into close proximity with said lineal series of right angularly directed burner fires during their continued rotation to form by said rotation and heating alone, solely by said rotation and heating, flat bottoms on said separated portions, each disposed at a right angle to the axis of each separated section, and transferring the newly-formed beakers to the point of deposition.

2. The method of simultaneously producing a pair of similar glass beakers from a single tubular glass blank having an appreciable diameter comprising the steps of rotating the blank about its axis in horizontal recumbent position at one station, heating one end portion of said blank into workable condition by adjacently-disposed burner fires during such rotation, flaring the heated end portion of the blank with a suitable working tool during such rotation, stopping the rotation and shaping a localized area of the flared end portion into a pour-out spout, immediately transferring the blank to a second station and performing the same rotating, heating, flaring, and pour-out spout forming steps on the opposite end portion of said blank, immediately transferring said blank to a third station and continuing the rotation heating an annular medial portion of said blank to workable condition with a lineal series of burner fires, directing the fires toward the intermediate portion of the blank at a right angle to the axis of the blank, controllably separating the blank at its heat-softened medial portion with continued heating of the blank while drawing the medial portion into a pair of irregularly-shaped closed ends, immediately moving the closed ends of the separated portions axially toward each other into close proximity with said right angularly directed burner fires during continued rotation to form solely by said rotation and heating a pair of similar beakers having individual flat bottoms of essentially uniform thickness on the separated sections, each disposed at a right angle to the axis of each separated section, and transferring the newly-formed pair of beakers into vertical and arcuate movement to a point of deposition.

3. The method in accordance with claim 2 including the step of additionally heating a localized area of said end portion and adjacent sidewall portion with burner fires with said blank at rest prior to shaping said pour-out spout.

4. The method of simultaneously producing a pair of flat-bottomed glass beakers from a single tubular glass blank comprising the steps of rotating the blank and simultaneously heating an intermediate portion thereof into heat-softened condition by a lineal series of burner fires, directing the fires toward the intermediate portion of the blank at a right angle to the axis of the blank, controllably separating the blank at its heated intermediate portions into separate sections during continued heating and rotation of the blank, drawing the separated sections fully apart to form irregular closed ends, and thereafter moving the separated sections axially toward and into close proximity with the right angularly directed burner fires while continuing rotation of the sections to form, solely by said rotation and heating, flat bottoms on the separated sections each disposed at a right angle to the axis of each separated section.

References Cited by the Examiner
UNITED STATES PATENTS 1,569,625  1/26  Halversen _____ 65—285

FOREIGN PATENTS 365,592  1/32  Great Britain.
365,594  1/32  Great Britain.

DONALL H. SYLVESTER, *Primary Examiner.*